UNITED STATES PATENT OFFICE.

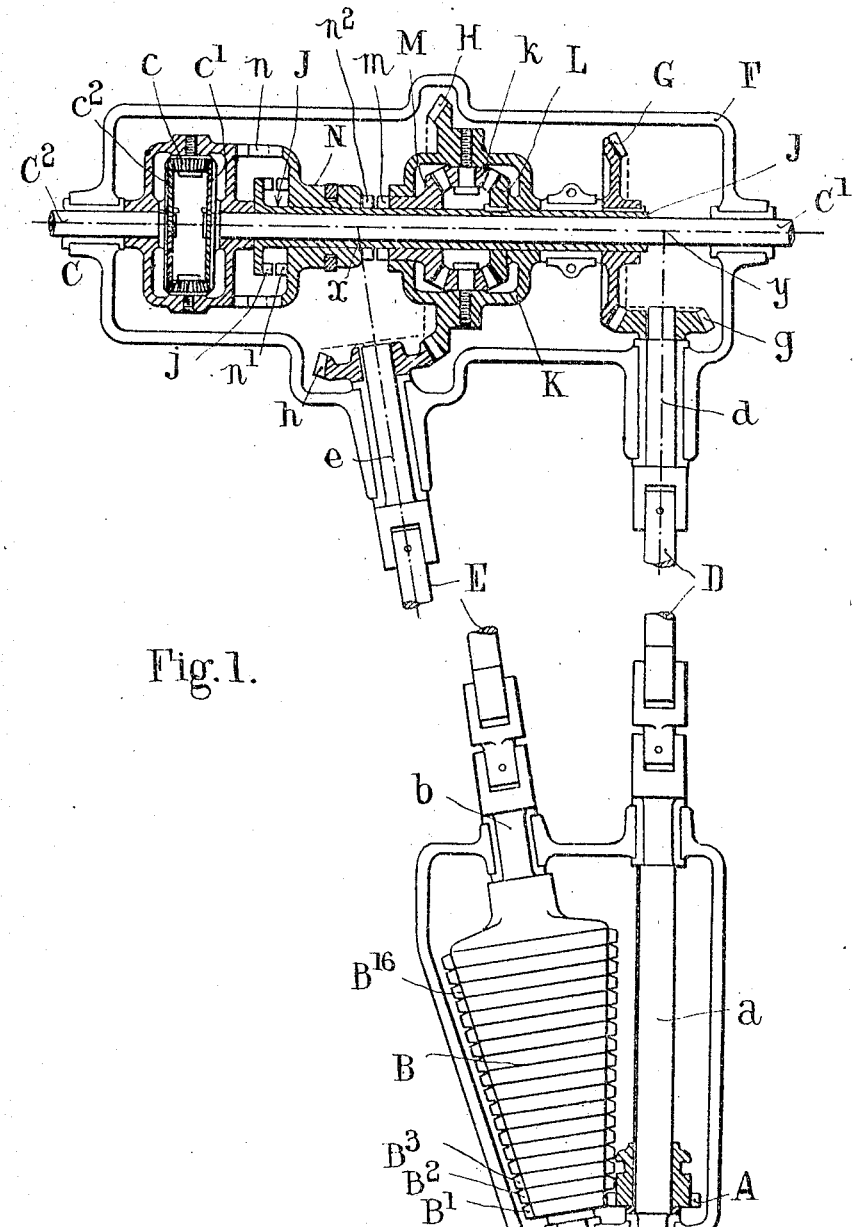

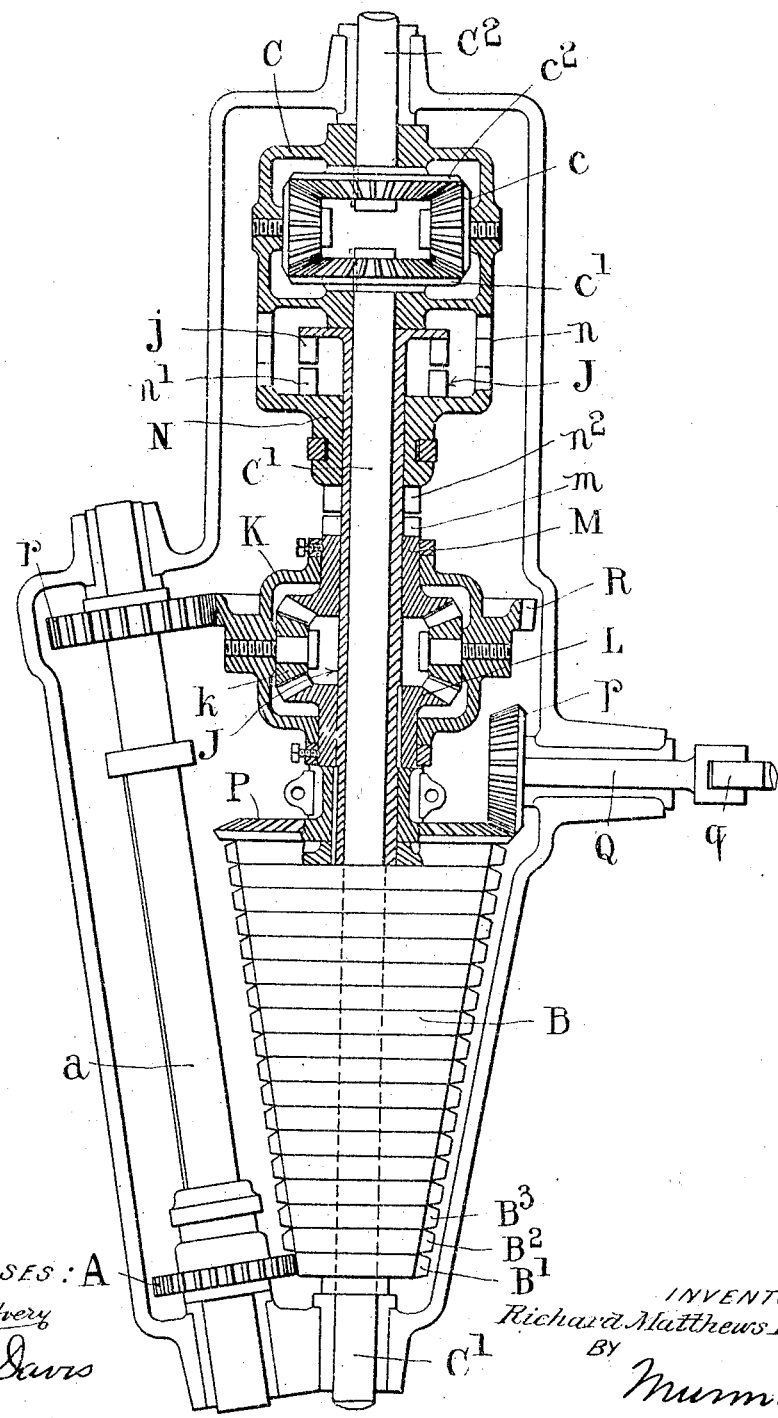

RICHARD MATTHEWS RUCK, OF LONDON, ENGLAND.

VARIABLE-SPEED DRIVING MECHANISM.

No. 912,736.   Specification of Letters Patent.   Patented Feb. 16, 1909.

Application filed August 30, 1907. Serial No. 390,734.

*To all whom it may concern:*

Be it known that I, RICHARD MATTHEWS RUCK, a subject of the King of Great Britain, and resident of 44 Thurloe Square, South Kensington, London, England, have invented certain new and useful Improvements in Variable-Speed Driving Mechanism, of which the following is a specification.

This invention relates to variable-speed transmission by means of mechanism which combines the advantages of positive driving with those of very gradual variation in the velocity-ratio of transmission, said mechanism comprising on the one hand what may be termed a toothed cone composed of a series of toothed rings of progressively varying diameter fixed side by side upon a common axis, and on the other hand a toothed pinion splined upon a rotary shaft extending parallel to the surface of the cone; the pinion being constantly in gear with one or other of the rings, and the speed at which rotary motion is transmitted between the axes of the cone and pinion being dependent upon the position, lengthwise of the cone, occupied by the pinion which is capable of being shifted along its shaft in either direction. The successive rings composing the cone have progressively varying numbers of teeth of equal pitch, and the relative angular position of the several rings is such that a straight row of teeth (or of intervals between two adjacent teeth in each ring) extends from end to end of the cone, with the result that the pinion may be caused to pass into gear with successive rings by being shifted along its shaft in either direction a distance equal to the width of one ring each time the straight row of teeth is brought, by the revolution of the cone, into the common plane of the axes of the cone and pinion. (For the sake of convenience, this plane may be called the "transfer plane").

The object of the present invention is to render variable-speed driving mechanism of this kind available for use on motor vehicles and in connection with other machinery driven by high-speed engines, in such manner that the velocity of the transmitted motion may be varied (say) from a maximum to nil and beyond the latter so as to obtain reversal, yet without the necessity of interrupting the running of the engine or altering its speed or direction of rotation.

Further objects of the invention are, to enable the motion to be transmitted (i. e. independently of the toothed cone) in certain circumstances, and, in the case of a motor vehicle, to provide improved means of braking the road wheels. These ends are attained by the employment, in combination with the variable speed transmission mechanism above described, of (on the one hand) an epicyclic train whereof one member is adapted to be connected to the part ultimately driven, a second member is rotated by the driven member of the variable-speed transmission mechanism, while a third member is rotated by the engine at a constant speed, and (on the other hand) a clutch-member capable of occupying either of three positions, in one of which it connects the part to be ultimately driven with the epicyclic train, in another it connects said part with the engine independently of the epicyclic train, and in the third it disconnects said part from both the engine and the epicyclic train. The arrangement is such that (assuming the toothed cone to be properly proportioned) it will be possible, for example, by putting the pinion-member of the variable speed transmission mechanism in gear with a particular ring of teeth on the cone, to cause the part ultimately driven to rotate at a velocity equal to *nil*, notwithstanding the fact that said part remains in gear with the engine while the latter continues to run at a constant and high velocity. When this is the case the part ultimately driven will not only receive no motion in either direction but will actually be locked against rotation and may thereafter be driven in one or the other direction by shifting the pinion-member of the variable-speed transmission mechanism in one or the other direction from the neutral zone constituted by that ring of the cone with which said pinion-member was until then in gear; the speed-ratio of the motion now transmitted increasing with the distance of the pinion-member from the neutral zone.

The invention will be described with reference to the accompanying drawings wherein —

Figures 1 and 2 respectively show, in plan view, two methods of applying the variable-speed transmission gear to the driving mechanism of a motor vehicle, similar reference letters indicating corresponding parts in both figures.

The pinion-member A of the variable-speed transmission gear is splined upon a shaft $a$ mounted to rotate in bearings parallel to the surface of the toothed cone B. The latter is composed of a series of rings $B^1$, $B^2$, $B^3$ etc. of progressively varying diameter mounted to turn as one, side by side, the pinion being constantly in gear with one or another of the rings, so that the speed at which rotary motion is transmitted between the axes of the cone B and pinion A is dependent upon the position, lengthwise of the cone, occupied for the time being by the pinion. In order to permit the pinion A to be moved along the cone so as to vary the speed of transmission, the successive rings $B^1$, $B^2$, $B^3$ etc. (which have progressively varying numbers of teeth of equal pitch) are set in such angular relation to one another that a straight row of teeth (or of intervals between two adjacent teeth in each ring) extends from end to end of the cone, with the result that the pinion may be caused to pass into gear with successive rings by being shifted along its shaft $a$, in either direction, a distance equal to the width of one ring each time the straight row of teeth is brought, by the revolution of the cone, into the transfer plane as already mentioned. Any convenient means may be adopted for thus shifting the pinion at will, and for so controlling its position, and coördinating its movements with the rotation of the cone, as to insure that the shifting of the pinion shall only take place at the proper time relatively to the passage of the straight row of teeth on the cone through the transfer plane.

In the arrangement shown in Fig. 1, the pinion-shaft $a$ derives its motion directly from the engine (not shown) and may, as indicated, extend at right angles to the driving axle whereof the two sections $C^1$ $C^2$ are connected as usual through the medium of differential gear. The latter comprises a casing C turning freely on both sections of the axle and carrying bevel pinions $c$ which gear with a pair of bevel wheels $c^1$, $c^2$ fast on the axle sections $C^1$ $C^2$ respectively. The toothed cone B (which in the present case is the driven member of the variable-speed gear) is fast upon a shaft $b$ which extends in the plane of, and may be oblique with reference to, both the pinion shaft $a$ and driving axle, the axis of the shaft $b$ intersecting that of the axle-section $C^1$ at a point $x$ situated between the inner end of said section and the point $y$ whereat the axis of the same section is intersected by that of the shaft $a$. The axle is capable of being put in driving connection, through the differential casing C, either with the pinion shaft $a$ alone, or with the cone shaft $b$ (under the control of the shaft $a$) according as it is required to drive said axle without or with the variable-speed mechanism, and it is also capable of being entirely disconnected from both the shafts $a$ and $b$ as for example when the cars running freely down-hill. For these purposes the shafts $a$ and $b$ are respectively connected, through Cardan shafts D and E, with shafts $d$ and $e$ journaled in bearings in the axle gear casing F and normally extending in alinement with the shafts $a$ and $b$, the countershafts $d$ and $e$ respectively having fast on their ends (within the casing F) bevel pinions $g$ and $h$, which in turn respectively gear constantly with bevel wheels G and H mounted concentrically on the axle-section $C^1$. The bevel wheel G is fast upon one end of a sleeve J turning freely on the axle-section $C^1$, while the bevel wheel H is fast upon (or integral with) the casing K of an epicyclic train mounted to turn freely on the sleeve J. The casing K carries bevel pinions $k$ which gear with a pair of bevel wheels L, M, whereof the one L is fast on the sleeve J, while the other M turns freely with reference to both the sleeve J and casing K. The sleeve J extends from the bevel wheel G to the differential casing C and has mounted to turn freely upon it, between the casing C and the bevel wheel M, a clutch N adapted in all positions to maintain driving connection with the casing C as for example by means of the long clutch-teeth $n$. The clutch N, through which all driving power is transmitted from the engine to the axle $C^1$, $C^2$, and which is capable of occupying either of three positions, may be provided with any convenient means for shifting it lengthwise of the sleeve J as required. The clutch is provided at opposite ends with teeth $n^1$, $n^2$ whereby it may be put in engagement either with clutch-teeth $j$ on the sleeve J or with clutch-teeth $m$ on the bevel wheel M, according as it is required to drive the axle $C^1$ $C^2$ without or with the toothed cone B.

When the clutch N is in the mid or inactive position shown on the drawing, no motion is transmitted from the engine to the differential casing C, and the two sections $C^1$ $C^2$ of the driving axle are free to rotate independently of the engine, whether the latter be running or not. If now, on the one hand the clutch N be shifted (toward the left in the drawing) so as to cause its teeth $n^1$ to engage the clutch-teeth $j$ on the sleeve J, motion will be transmitted from the engine through the shafts $a$, D, $d$, bevel gearing $g$, G, sleeve J, clutch-teeth $j$, $n^1$, clutch N and clutch-teeth $n$ to the differential casing C, and thence through the bevel pinions $c$ and bevel wheels $c^1$ $c^2$ to the respective axle-sections $C^1$ $C^2$. The speed of the motion so transmitted will be constant, being entirely independent of the position of the pinion A relatively to the cone B which however will be rotated in consequence of its constant engagement with the pinion A and will drive idly the epicyclic casing K. If, on the other hand, the clutch N be shifted (toward the right in the drawing) so as to cause its teeth $n^2$ to engage the clutch-teeth $m$ on the bevel wheel M, the speed of the motion transmitted by this wheel M to the clutch N will be compounded of the invariable speed of the motion communicated to the wheel L and the variable speed of the motion communicated through the pinion A and cone B to the epicyclic casing K and pinions $k$. That is to say, the motion transmitted to the wheel M from the engine through the shaft $a$, pinion A, toothed cone B, shafts $b$, E, $e$, bevel gearing $h$, H, epicyclic casing K, bevel pinions $k$, bevel wheel M, clutch-teeth $m$, $n^2$ clutch N, and clutch-teeth $n$, to the differential casing C, and thence as before to the respective axle-sections $C^1$, $C^2$, will be partly dependent upon the speed of the wheel L which (being driven at constant velocity through the shafts $a$, D and $d$ and bevel gearing $g$, G) controls the rotation of the pinions $k$. The motion of the wheel M will also depend upon the position of the pinion A lengthwise of the cone B, and it will be obvious that, by shifting this pinion along the cone in the manner already mentioned, any speed may be obtained at will within the limits of capacity of the cone. Assuming the epicyclic train to be capable of doubling the speed then if the ratios of the gearing $g$ G and $h$ H are in each case 1:2 when the pinion A is in gear with that ring of the cone (such as $B^{16}$) which has twice as many teeth as the pinion A itself, no motion will be communicated to the differential casing C, and therefore the axle-sections $C^1$, $C^2$ and the road-wheels carried thereby, will be locked without the employment of any brake-gear external to the mechanism now under consideration. Moreover, by shifting the pinion A farther toward the larger end of the cone B, the axle $C^1$ $C^2$ will be rotated in the reverse direction, the ring $B^{16}$ constituting what may be termed the neutral zone of the cone B, and motion being transmitted by the cone in one or the other direction according as the pinion A gears with a ring at the one or the other side of the neutral zone $B^{16}$, and at a speed which increases with the distance of the pinion A from said neutral zone.

It will be evident that so long as the clutch N is in the mid position shown, the engine, being unloaded, can be started at top speed without difficulty. No other clutch besides N is required between the engine and gearing, or the usual clutch (if retained) may be left in gear. Moreover, if (under the conditions just assumed) the engine had previously been stopped when the pinion A was in gear with the neutral zone $B^{16}$ of the cone, the engine could be re-started without load notwithstanding that the clutch N might be engaged with the epicyclic casing K, the speed of transmission being thereafter gradually increased from nil, for forward or backward running as desired, by shifting the pinion A in the corresponding direction and to the requisite distance from the neutral zone.

The arrangement shown in Fig. 2 is in most respects essentially similar to that above described. In the present case however, the pinion A is the driven member of the variable-speed gear, while the cone B is mounted directly upon the axle-section $C^1$ whereon it is free to rotate as one with the sleeve J to which the cone is fixed, the cone being provided at one end with a bevel wheel P which is constantly in gear with a bevel pinion $p$ fast on a shaft Q which is journaled in a bearing in the axle gear casing F and driven from the engine (not shown) through the medium of a Cardan shaft as indicated at $q$. The pinion shaft $a$ is journaled in bearings in the casing F and is permanently in gear with the epicyclic casing K which turns freely on the sleeve J, the shaft $a$ and sleeve J having respectively fast upon them bevel wheels $r$, R which are constantly in gear with one another. The casing K carries bevel pinions $k$ which gear with bevel wheels L, M whereof L is fast on the sleeve J, while M turns freely with reference to both the casing K and sleeve J. The clutch N (through which as before all driving power is transmitted from the engine to the axle $C^1$ $C^2$) turns freely on the sleeve J and, while capable of occupying either of three positions, is constantly in engagement as at $n$ with the differential casing C. The clutch is provided at opposite ends with two sets of teeth $n^1$ $n^2$, whereby it may be put in engagement either with clutch-teeth $j$ on the sleeve J or with clutch-teeth $m$ on the bevel wheel M, according as it is required to drive the axle $C^1$ $C^2$ through, or independently of, the epicyclic train K, L, M. When the clutch N is in the mid or inactive position shown on the drawing, no motion is transmitted from the engine to the differential casing C, and the two sections $C^1$ $C^2$ of the driving axle are free to rotate independently of the engine, whether the latter be running or not. If, now, on the one hand the clutch N be shifted so as to cause its teeth $n^1$ to engage the clutch-teeth $j$ on the sleeve J, motion will be transmitted from the engine through the shaft Q, bevel gearing $p$, P, sleeve J, clutch-teeth $j$, $n^1$, clutch N and clutch-teeth $n$, to the differential casing C, and thence through the bevel pinions $c$ and bevel wheels $c^1$, $c^2$ to the respective axle-sections $C^1$ $C^2$. The speed of such transmission will be constant, being entirely independent of the position of the pinion A lengthwise of the cone B. The pinion A being however rotated by the cone, will drive idly the epicyclic casing K. If on the other hand the clutch N be shifted so as to cause its teeth $n^2$ to engage the clutch-teeth $m$ on the bevel wheel M, the speed of the motion transmitted by this wheel M to the clutch N will be compounded of the invariable speed of the motion communicated to the wheel L and the variable speed of the motion communicated through the cone B and pinion A to the epicyclic casing K and pinions $k$. That is to say the motion transmitted to the wheel M from the engine through the shaft Q, bevel gearing $p$, P, cone B, pinion A, shaft $a$, bevel gearing $r$, R, epicyclic casing K, pinions $k$, bevel wheel M, clutch-teeth $m$, $n^2$, clutch N, and clutch-teeth $n$ to the differential casing C, and thence as before to the respective axle-sections $C^1$, $C^2$, will be partly dependent upon the speed of the wheel L which (being driven at constant velocity through the bevel gearing $p$, P) controls the rotation of the pinions $k$. The motion of the wheel M will also depend upon the position of the pinion A lengthwise of the cone B, and assuming that the wheel R is twice the diameter of the pinion $r$, there may (as in the case of Fig. 1) be one of the rings of the cone (such as $B^3$) which will serve as a neutral zone, no motion being communicated to the differential casing, but the road-wheels being locked, when the pinion A is in gear with this ring. In such case the shifting of the pinion in either direction from its position of engagement with the neutral zone will result as before in the axle $C^1$, $C^2$ being driven in the corresponding direction and at a speed which increases with the distance of the pinion A from said neutral zone. It will further be evident that, as in the previous arrangement, no other clutch than N is required between the engine and gearing, and that the engine can be started at top speed without load when the clutch N is in the mid position shown, while, if the engine had previously been stopped with the pinion A in gear with the neutral zone $B^{16}$ of the cone, the engine could be started at top speed without load notwithstanding that the clutch N might be engaged with the epicyclic casing K, the speed being thereafter gradually increased from $nil$, for forward or backward running as desired, by shifting the pinion A in the corresponding direction and to the requisite distance from the neutral zone.

Claims.

1. Variable speed transmission mechanism comprising a toothed cone, a toothed pinion constantly in gear therewith, an epicyclic train whereof one member is adapted to be connected to the part ultimately driven, a second member is rotated by the driven member of said variable-speed transmission mechanism, while a third member is rotated at a constant speed from the source of power, and a clutch member capable of occupying either of three positions, in one of which it connects the part to be ultimately driven with the epicyclic train, in another it connects said part with the source of power independently of the epicyclic train, and in the third it disconnects said part from both the source of power and the epicyclic train, substantially as and for the purpose set forth.

2. In a transmission mechanism, a sectional shaft to be driven, differential gearing connecting the sections of the shaft, a sleeve on the shaft, an epicyclic train on the sleeve, a clutch member on the sleeve, said clutch member having a constant driving connection with the differential gearing and adapted to connect the sleeve or one of the gears of the epicyclic train with the differential gearing, a shaft, a toothed cone on the shaft, a shaft, an adjustable pinion on the last named shaft and meshing constantly with the cone, and means for operating the sleeve and epicyclic train from the pinion and cone shafts.

3. In a transmission mechanism, a sectional shaft to be driven, differential gearing connecting the sections of the shaft, a sleeve on one shaft section, an epicyclic train mounted to turn on the sleeve, a toothed cone, gearing connecting the epicyclic train with the cone, a shaft geared with the sleeve, a pinion slidable on the shaft and constantly in mesh with the cone, and a clutch member on the sleeve and having a constant driving connection with the differential gearing and adapted to connect the sleeve or one of the gears of the epicyclic train with the differential gearing.

4. In a transmission mechanism, a sectional shaft to be driven, a casing mounted on the shaft sections, differential gearing in the casing and connecting the shaft sections, a sleeve on one shaft section, a gear at one end of the sleeve, a casing mounted on the sleeve, a peripheral gear carried by the casing, an epicyclic train in the said casing, a shaft, a pinion thereon and meshing with the gear of said casing, a toothed cone on the shaft, a shaft, a pinion on the shaft and meshing with the gear on the sleeve, a pinion slidable on the said shaft and meshing constantly with the cone, and a clutch member on the sleeve between the casings of the differential and the epicyclic gears, said clutch member being in connection at all times with the differential gear and adapted to connect the sleeve with the differential gear casing or the epicyclic train with the said casing.

London, July twenty-third 1907.

RICHARD MATTHEWS RUCK.

Witnesses:
A. MAXWELL CLARK,
M. SPIER,